June 18, 1929.  J. SNEED  1,717,631

BRAKE SHAFT

Filed Aug. 16, 1926  2 Sheets—Sheet 1

INVENTOR.
JOHN SNEED
BY Rex Frye
ATTORNEY.

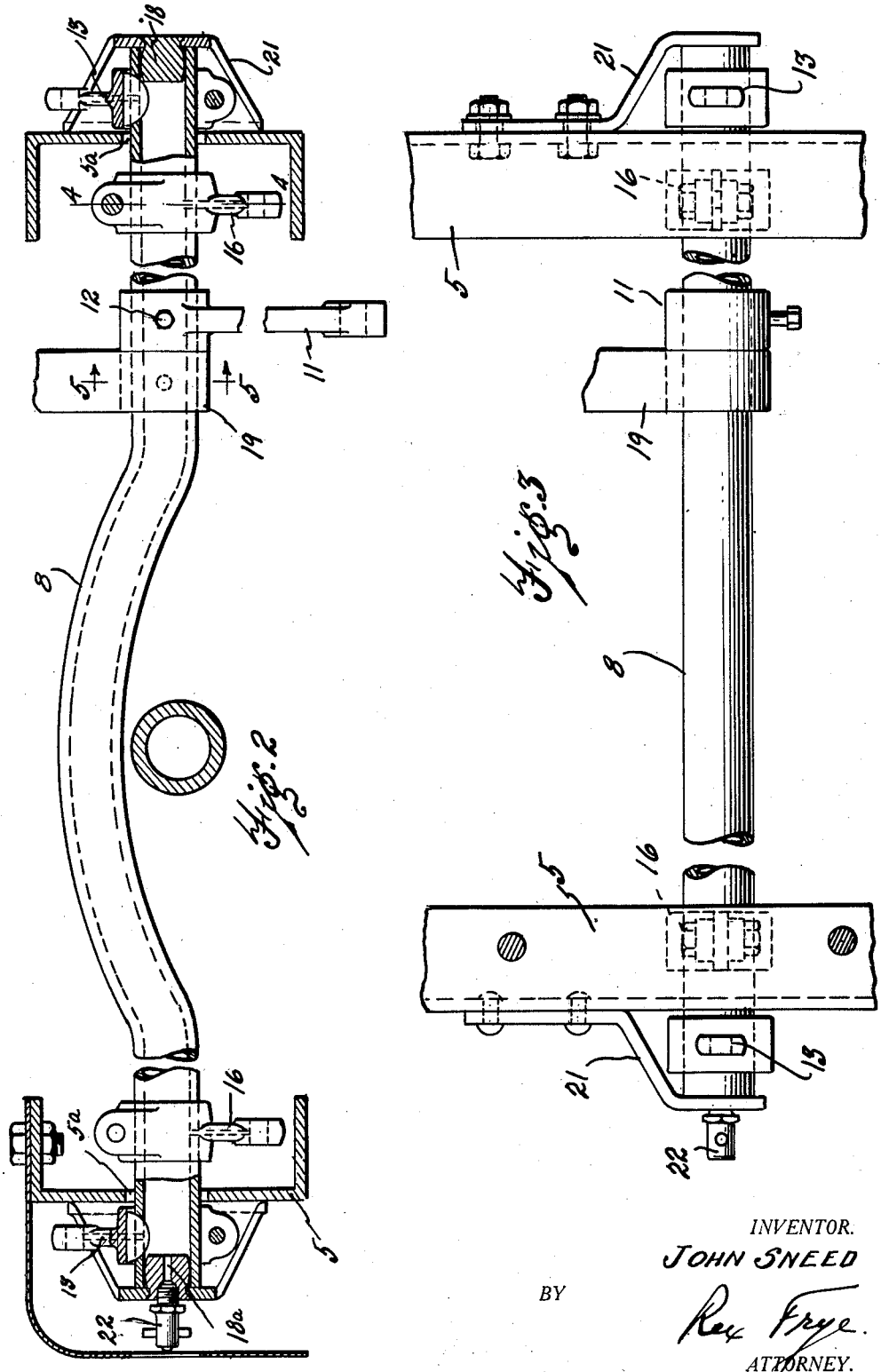

Patented June 18, 1929.

1,717,631

UNITED STATES PATENT OFFICE.

JOHN SNEED, OF DETROIT, MICHIGAN, ASSIGNOR TO STEELDRAULIC BRAKE CORPORATION, OF DETROIT, MICHIGAN, A CORPORATION OF MICHIGAN.

BRAKE SHAFT.

Application filed August 16, 1926. Serial No. 129,409.

One of the objects of my invention is the provision of a tubular brake shaft mounted to oscillate upon a vehicle chassis and comprising a self-contained oil reservoir for the lubrication of all of its bearings.

A further object of my invention is the arrangement of a tubular open-ended brake shaft upon a pair of bearings arranged to substantially close the open ends of the shaft, whereby a substantially closed lubricant reservoir is formed within the brake shaft. One of the end bearings may be constructed to facilitate the introduction of lubricant into the reservoir within the hollow shaft.

Other objects and advantages will be apparent from the following description, wherein reference is made to the accompanying drawings illustrating a preferred embodiment of my invention and wherein similar reference numerals designate similar parts throughout the several views.

In the drawings:

Fig. 2 is an enlarged cross sectional view taken substantially on the line 2—2 of Fig. 1.

Fig. 3 is an enlarged plan view of the brake shaft and the chassis frame members upon which it is carried, parts being broken away.

Figure 4:
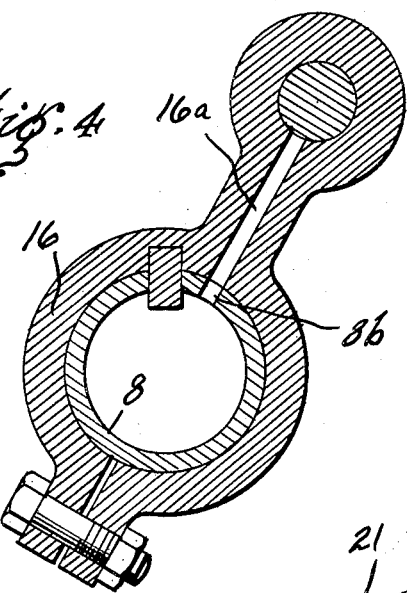
Figure 5:
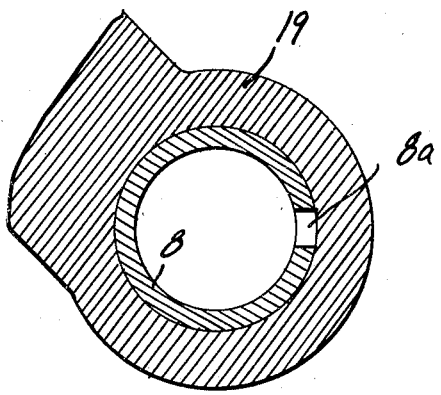
Figure 6:
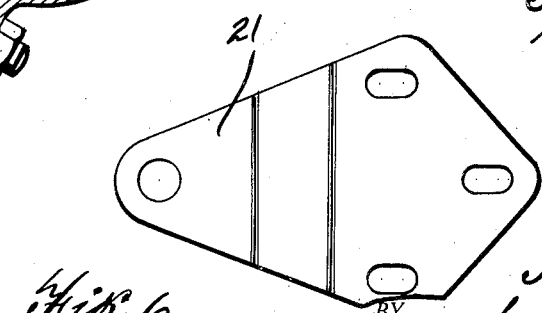

Figs. 4 and 5 are detail sectional views taken substantially on the lines 4—4 and 5—5 of Fig. 2, and Fig. 6 is an end view of one of the bearing carrying plates utilized for supporting the ends of the brake shaft.

Figure 1:
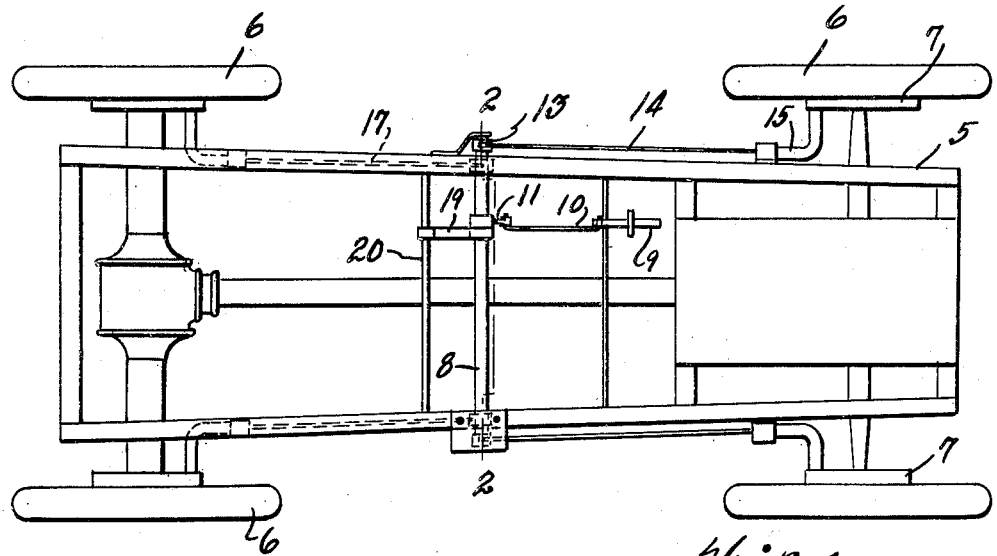
Fig. 1 is a plan view of the chassis of a vehicle equipped with my improved brake shaft.

Referring now to the drawings, the numeral 5 designates a chassis of any desired shape and size equipped with four wheels 6 of the usual or any desired type. Since the chasis and the wheels themselves form only an incidental relation to the claimed disclosure herein, no attempt has been made to illustrate and describe a completely operative driving and steering mechanism for the wheels 6, it being understood that the showing herein is only for purposes of exemplification of the manner of mounting the brake shaft forming the claimed disclosure herein and one manner of connecting said brake shaft with the brakes on four wheels of a vehicle. Each wheel 6 carries a brake drum 7 adapted to house a brake shoe so that the lining of the brake shoe is adapted to engage the inner periphery of the brake drum whenever the brake actuating mechanism is operated to set the brakes upon oscillatory movement of the brake shaft 8. As best shown in Figs. 1 and 2 the brake shaft 8 is suitably connected with a brake pedal 9 pivotally mounted upon the vehicle chassis, as through the link 10 and depending arm 11 fixed upon the brake shaft 8, as by means of the set screw 12. The brake shaft 8 also carries radially disposed arms for transmitting movement to the several brakes of the vehicle. Thus, adjacent each end of the brake shaft 8 is arranged an upwardly extending arm 13 connected with the rear extremity of a cable 14, the opposite extremity of which is connected with means for throwing the brake shoe into engagement with the brake drum, the intermediate portion of the cable passing through a flexible conduit 15 arranged between the chassis and the apron of the adjacent brake drum. This forms means for simultaneously operating the brakes of the front wheels of the vehicle. Similarly the brake shaft 8 carries a pair of depending arms 16 inwardly of the arms 13 and connected with the forward extremities of the cables 17, the opposite extremities of which are connected with means for throwing the brake shoes into contact with the brake drums of the rear wheels of the vehicle. One form of means for connecting a brake shaft whereby the brakes of all four wheels of the vehicle may be simultaneously operated is disclosed in my companion application, Serial No. 30,459, filed May 15, 1925, but it is to be understood that the brake shaft forming the claimed subject matter herein is adapted for use with various operating means for actuating the brakes upon all four wheels of the vehicle or a lesser number.

The brake shaft 8 extends through apertures 5$^a$ in the side frames of the chassis 5, which apertures are of greater diameter than the diameter of the brake shaft, and is mounted for oscillatory movement upon a pair of end bearings 18 and within one or more supporting brackets 19 carried by the vehicle chassis. In the illustrated embodiment one supporting bracket 19 is shown extending forwardly from a cross bar 20 of the vehicle chassis and supporting the brake shaft intermediate its ends. The end bearings 18 and the intermediate bearings 19 are adapted to be lubricated from a lubricant reservoir within the brake shaft itself. To this end the brake shaft is formed as a hollow tube with open ends, and the end bearings 18 are formed with their peripheries adapted to engage the inner peripheral wall of the brake shaft with a point or vertical line bearing. Preferably each end bearing 18 is formed as a truncated spheroid with its diameter very slightly less than the diameter of the inner periphery of the tubular brake shaft. By virtue of this construction the end bearings serve as plugs to hold the lubricant within the hollow brake shaft while also serving as bearings for the ends of the brake shaft. Each end bearing 18 is herein shown as carried upon a bracket 21 suitably secured upon the side portions of the chassis 5, and shaped substantially as shown in Figs. 3 and 6. The brackets 21 may be riveted or otherwise firmly secured to the side frames, but preferably one of the brackets 21 is adjustably mounted upon a side portion of the chassis 5 to enable the ready alignment of the brake shaft during the assembly or repair of the vehicle. As best shown in Fig. 5 the brake shaft 8 is formed with a radial aperture 8$^a$ for transmitting the lubricant from within the brake shaft to the bearing portion of the supporting bracket 19. Also, as best shown in Fig. 4, apertures 8$^b$ in the brake shaft may be aligned with passageways 16$^a$ in the bracket arms 16, whereby lubricant may be supplied from within the brake shaft to the ends of the cables 17 or other actuating member connecting the brake shaft with the brake drum expanding members. When the arms 16 are arranged substantially as shown in Fig. 2 the lubricant will fall by gravity from within the brake shaft into engagement with the apertured portion of the bracket arm and the periphery of the cable or other connecting member passing through such apertured portion.

One of the end bearings 18 may be constructed and arranged to permit the ready introduction of lubricant into the hollow brake shaft 8. In the illustrated embodiment an alemite nipple 22 is mounted in one of the end bearings 18 in alignment with a passageway 18$^a$ in the bearing. With this construction lubricant may be forced through the alemite nipple and passageway 18$^a$ into the brake shaft until the hollow brake shaft is filled to the desired extent.

From the above it will be apparent that my improved brake shaft is adapted to contain a reserve supply of lubricant independent of other chassis lubrication and that means are provided for transmitting the lubricant to the bearing surfaces as needed. Moreover, the brake shaft may be shaped as desired to clear adjacent members carried by the vehicle without affecting its oscillation or its lubricant holding properties. In Fig. 2 is shown a construction of brake shaft wherein the central portion is raised above the end portions to clear the propeller shaft of the vehicle and its casing. Such construction permits the passage of lubricant from the end bearing carrying the alemite coupling 22 and also serves to lead the lubricant within the shaft into contact with the end bearings and bracket arms mounted adjacent the extremities of the brake shaft.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim—

1. The combination with a vehicle chassis, of a hollow tubular brake shaft, a bracket carried by the chassis and arranged to form an external bearing for the brake shaft, a pair of end bearings arranged to form internal bearing members for the brake shaft, and means for introducing lubricant into the brake shaft, the brake shaft being formed with an aperture adapted to permit the lubricant from within the brake shaft to contact the bearing surface of said external bearing.

2. The combination with a vehicle chassis, of a tubular brake shaft, means for mounting said brake shaft for oscillatory movements including a pair of internal bearings carried by the chassis and extending into and arranged to seal the ends of the brake shaft, and means for introducing lubricant into the brake shaft through one of said internal bearings, and intermediate bearings carried by the chassis and externally supporting the brake shaft, the brake shaft being provided with apertures for conducting lubricant to said intermediate bearings.

In witness whereof I hereunto set my hand.

JOHN SNEED.